United States Patent
Chen

(10) Patent No.: US 6,873,666 B2
(45) Date of Patent: Mar. 29, 2005

(54) CIRCUIT AND METHOD FOR SYMBOL TIMING RECOVERY IN PHASE MODULATION SYSTEMS

(75) Inventor: Shih-Heng Chen, Taoyuan Hsien (TW)

(73) Assignee: Syncomm Technology Corporation, Taoyuan Hsien (TW)

( * ) Notice: Subject to any disclaimer, the term of this patent is extended or adjusted under 35 U.S.C. 154(b) by 812 days.

(21) Appl. No.: 09/764,516

(22) Filed: Jan. 18, 2001

(65) Prior Publication Data

US 2002/0097819 A1 Jul. 25, 2002

(30) Foreign Application Priority Data

Nov. 13, 2000 (TW) ........................................ 89123972 A

(51) Int. Cl.$^7$ ........................... H04L 27/06; H04L 27/22
(52) U.S. Cl. ........................ 375/343; 375/330; 375/355
(58) Field of Search .............................. 375/279, 280, 375/281, 282, 283, 284, 329, 330, 331, 332, 333, 340, 354, 355

(56) References Cited

U.S. PATENT DOCUMENTS

| 4,146,841 A | * | 3/1979 | McRae | 375/330 |
| 4,941,155 A | * | 7/1990 | Chuang et al. | 375/330 |
| 5,892,803 A | * | 4/1999 | Saunders et al. | 375/355 |
| 6,212,246 B1 | * | 4/2001 | Hendrickson | 375/355 |

* cited by examiner

Primary Examiner—Chieh M. Fan
(74) Attorney, Agent, or Firm—Senniger Powers

(57) ABSTRACT

The present invention relates to a circuit and method for symbol timing recovery in phase modulation systems. First, phase differences of in-phase signals and quadrature signals in a polar coordinate are generated at the same sampling points of neighboring symbols. Second, an operator is generated by taking a square of a value subtracting the phase difference from a default phase value. Third, the sums of phase differences of every sampling point in a symbol are computed to determine an optimal sampling point in a symbol period and correctly recover symbol timing of signal sequences. By the above properties, the present invention has a simple structure and can shorten an execution time.

11 Claims, 4 Drawing Sheets

CIRCUIT AND METHOD FOR SYMBOL TIMING RECOVERY IN PHASE MODULATION SYSTEMS

BACKGROUND OF THE INVENTION

1. Field of the Invention

The present invention relates to a circuit and method for symbol timing recovery in phase modulation systems, and particularly to a circuit and method for symbol timing recovery, which generates optimal sampling points only operating in a polar coordination.

2. Description of the Related Art

In the technology of a digital wireless baseband demodulation, π/4-DQPSK baseband demodulation has been widespreadly used. For example, USDC and PACS system in North America, and PDC and PHS system in Japan adopt π/4-DQPSK baseband modulation and demodulation to design their wireless system modems. The advantage of π/4-DQPSK baseband technology is high efficiency, high performance and easy to implement a receiver.

The prior π/4-DQPSK baseband modulation and demodulation technology modulates transmission signals at a transmission end, and convert the signals to phase representations $$\left(\frac{\pi}{4}, \frac{3\pi}{4}, \frac{5\pi}{4} \text{ and } \frac{7\pi}{4}\right)$$

which act as phase differences of continuous neighboring signals for representing transmission bit signals.

When demodulated at a receiving end, the received intermediate frequency (IF) signals are first converted into digital signals through an analog/digital converter, and then transmitted to a digital front end to generate a digital baseband in-phase signal $I_n$ and quadrature signal $Q_n$. Next, the signals are transferred to a rectangular coordinate to compute optimal sampling points, that are the same with points corresponding to the transmission signals at a transferring end. The above description is illustrated in U.S. Pat. No. 4,941,155, titled "METHOD AND CIRCUITRY FOR SYMBOL TIMING AND FREQUENCY OFFSET ESTIMATION IN TIME DIVISION MULTIPLE ACCESS RADIO SYSTEMS." The prior art takes digital baseband in-phase signal $I_n$ and quadrature signal $Q_n$ as input signals, and processes a symbol timing recovery method as follows:

(1) generating a phase difference Δθ of input signals;
(2) multiplying the phase difference by four;
(3) transferring the result from a polar coordinate to a rectangular coordinate;
(4) using 16 accumulators to compute 16 vector summations, wherein $$f_i(X, Y) = \left(\sum_{n=16N+1} X_n\right)^2 + \left(\sum_{n=16N+1} Y_n\right)^2, \quad 1 \le i \le 16;$$

and
(5) locating optimal sampling points at positions having the maximum value of $f_i(X,Y)$.

The computation process is very complex, and especially a lot of mathematical transformations are executed between the polar coordinate and rectangular coordinate. For the prior art, not only the computation method is trivial, but also the executing time is very long.

SUMMARY OF THE INVENTION

A first object of the present invention is to propose a circuit and method for symbol timing recovery in phase modulation systems. An optimal sampling point in a symbol is found to recover the symbol timing of signal sequences.

A second object of the present invention is to simplify the circuit and method for symbol timing recovery for reducing an execution time.

For achieving the above purposes, the present invention discloses a circuit and method for symbol timing recovery in phase modulation systems, which first generates phase differences at the same sampling points of the neighboring symbols in the polar coordinate. Secondly, a square of the value subtracting the above result from a default phase value is generated. Thirdly, all phase differences in a symbol time are summed to determine the optimal sampling points in a symbol period. By the above features, the present invention not only simplifies the stricture of the circuit, but also shortens an execution time.

One embodiment of the circuit of the present invention is utilized in a phase demodulator, generating phase differences at the same sampling points of neighboring symbols to determine an optimal sampling point in a symbol period. The present invention comprises a phase difference generating circuit, a selection circuit, an accumulation module and a comparison module. The phase difference generating circuit first maps the phase difference to a first quadrant of a phase plane, then subtracting the mapped difference by a default phase value to obtain a result and taking a square of the result. The selection circuit is connected to the phase difference generating circuit for outputting the result of a phase difference of every sampling point of a symbol to its corresponding output end. The accumulation module includes accumulators whose number is equal to the number of the sampling points in a symbol. The accumulators receive the outputs of the selection circuit for accumulating phase differences of the same sampling points of continuous neighboring symbols. The comparison module is to compare the sums of phase differences outputted from the accumulators. The optimal sampling point corresponds to an accumulator having the smallest sum of the phase differences.

Another embodiment of the circuit of the present invention is utilized in a phase demodulator to generate phase differences at the same sampling points of neighboring symbols to determine an optimal sampling point in a symbol period. The present invention comprises a phase difference generating circuit, an operation circuit, a delay circuit module, and a comparison module. The phase difference generating circuit maps the phase difference to a first quadrant of a phase plane, then subtracting the mapped difference by a default phase value to obtain a result and taking a square of the result. The operation circuit is to accumulate the squared result of phase differences of the same sampling points of neighboring symbols. The delay circuit module includes a plurality of delay circuits whose number is equal to the number of sampling points in a symbol. The delay circuits are connected in series and the output of the last delay circuit is cooperated with the operation circuit to generate an input to a first delay circuit. The comparison module is to compare the sums of phase differences outputted from the delay circuit module. The optimal sampling point corresponds to a delay circuit generating a smallest sum of the phase differences.

One embodiment of the method of the present invention is utilized in a phase demodulator, to generate phase differences at the same sampling points of neighboring symbols to determine an optimal sampling point in a symbol period. The present invention comprises steps (a) to (d). In step (a), a phase difference is mapped into a first quadrant of a phase plane. In step (b), the phase difference mapped to the first quadrant is subtracted by a default phase value to obtain a result, and taking a square of the result. In step (c), a phase differences of every sampling point in a symbol is computed, and phase differences at the same sampling points of the continuous neighboring symbols are accumulated. In step (d), a sampling point having the smallest sun of the phase differences is determined, and thereby an optimal sampling point is obtained.

The present invention could be implemented by a software program. Since the structure of the present invention is simple and has fewer operations, the advantages mentioned above will be available with a software implementation.

BRIEF DESCRIPTION OF THE DRAWINGS

The invention will be described according to the appended drawings in which.

PREFERRED EMBODIMENT OF THE PRESENT INVENTION

Figure 1:
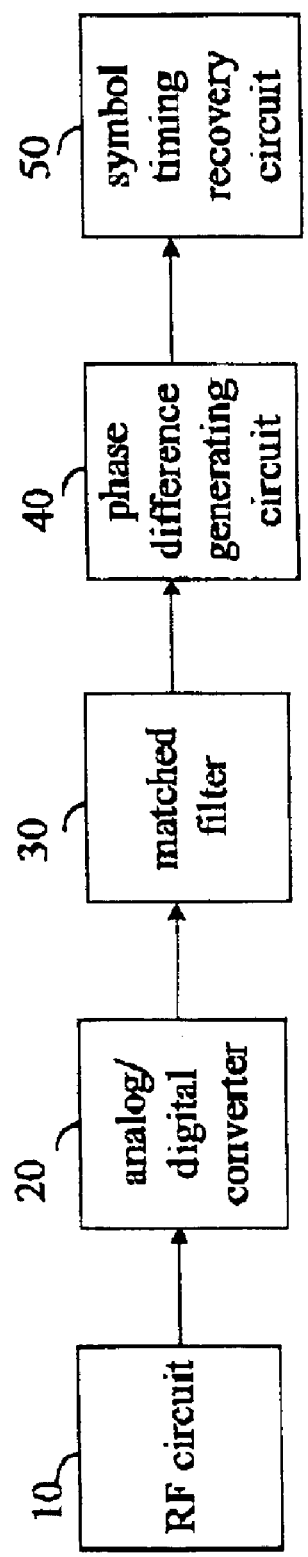
FIG. 1 is a block diagram of the symbol timing recovery circuit in phase modulation systems according to the present invention.
Figure 2:
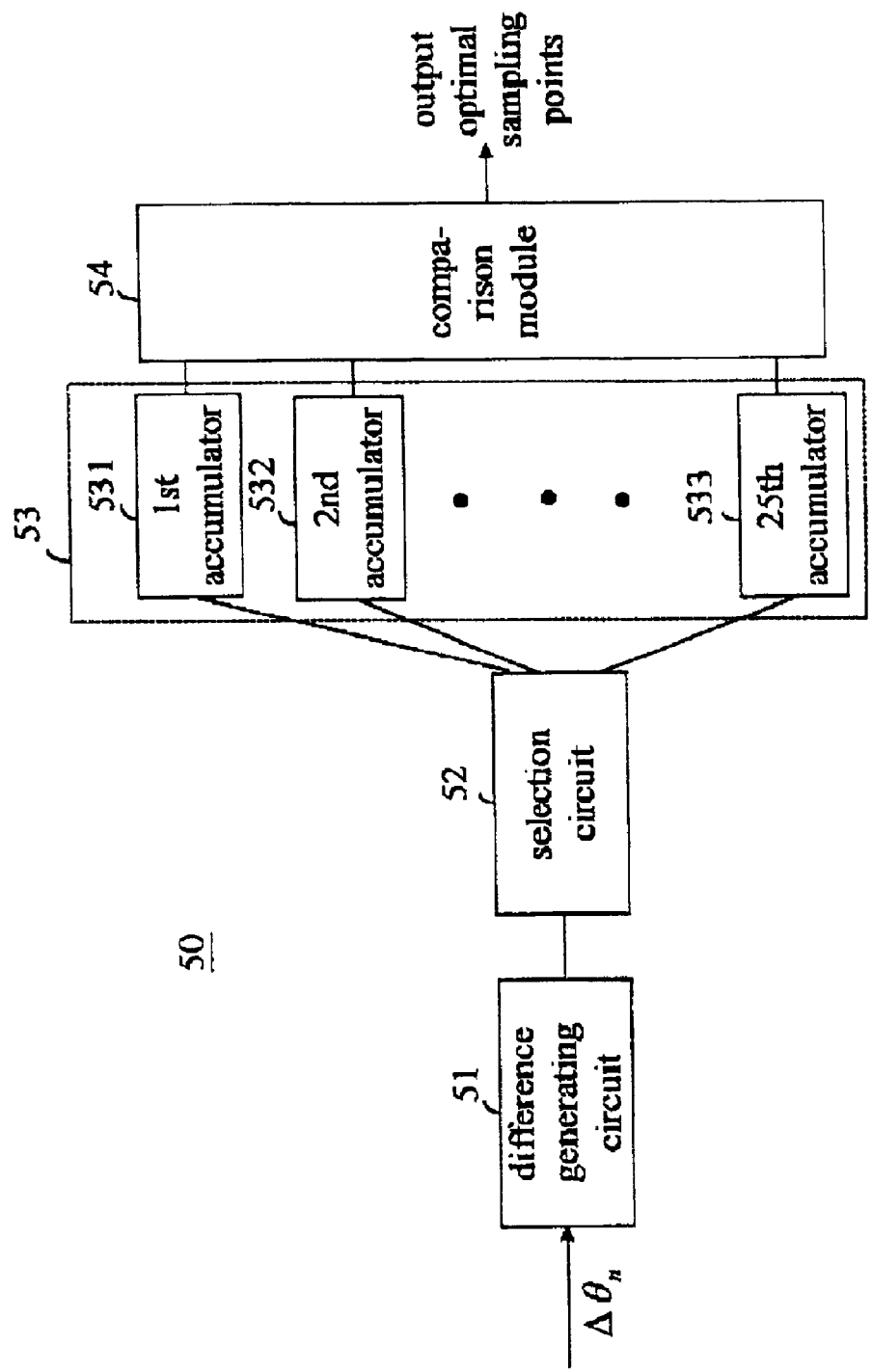
FIG. 2 is a block diagram of an embodiment of the symbol timing recovery circuit according to the present invention.

Please refer to FIGS. 1 and 2. FIG. 1 is a block diagram of the symbol timing recovery circuit in phase modulation systems according to the present invention. The demodulator comprises a RF circuit 10, an analog/digital converter 20, a matched filter 30, a phase difference generating circuit 40 and a symbol timing recovery circuit 50. The RF circuit 10 generates an analog intermediate frequency (IF) signal. The analog/digital converter 20 digitizes the IF signal at an appropriate rate. The matched filter 30 translates the digital signal to baseband to obtain in-phase signal $I_n$ and quadrature signal $Q_n$ which determine a phase $\theta=\tan^{-1}(Qn/In)$. In the embodiment, the analog/digital converter 20 samples the in-phase signal and quadrature sign in a sample rate which is 25 times of a symbol rate, and therefore there are 25 sampling points in a symbol period. The phase difference generating circuit 40 first generates an present phase $\theta$ according to the in-phase signal and quadrature signal corresponding to every sampling point, the difference between the present phase $\theta$ and a previous phase determined by the same sampling point of a previous symbol is called first phase difference $$\Delta\theta_n^1,$$

wherein $$\Delta\theta_n^1$$

is represented in a binary format, $$\Delta\theta_n^1 = \theta_n^1 - \theta_{n-25}^1,$$

n represents a serial number of all sampling points, and $$\theta_n^1 \text{ and } \theta_{n-25}^1$$

respectively represents the present phase and the previous phase at the same sampling points of neighboring symbols.

Please refer to FIG. 2. The symbol timing recovery circuit 50 of a first embodiment of the present invention comprises a phase difference generating circuit 51, a selection circuit (for example, a demultiplexer 52), an accumulation module 53 and a comparison module 54. The phase difference generating circuit 51 first maps the first phase difference $\Delta\theta_n^1$ to a first quadrant of a phase plane. In the embodiment, the most significant two bits of the first phase difference $$\Delta\theta_n^1$$

are discarded to generate a new phase difference called second phase difference $$\Delta\theta_n^2.$$

Next, a square of the difference between the second phase difference $$\Delta\theta_n^2 \text{ and } \pi/4,$$

that is $$\left(\Delta\theta_n^2 - \frac{\pi}{4}\right)^2,$$

is computed. An important issue is that the first phase difference $$\Delta\theta_n^1$$

is one of $\pi/4$, $3\pi/4$, $5\pi/4$ and $7\pi/4$ in a noise free and phase offset free condition. The first phase difference $$\Delta\theta_n^1$$

corresponds to the first quadrant, and the second phase difference $$\Delta\theta_n^2$$

becomes $\pi/4$. Therefore, the difference between the second phase difference $$\Delta\theta_n^2$$

and $\pi/4$ is the basis to determine an optimal sampling point.

The demultiplexer 52 outputs 25 phase differences in sequence, which are generated by the phase difference generating circuit 51 in an equation $$\left(\Delta\theta_n^2 - \frac{\pi}{4}\right)^2.$$

The 25 phase differences are transmitted to the corresponding first to 25$^{th}$ accumulators individually included in an accumulation module 53 (25 sampling points respectively correspond to their accumulators) to accumulate the phase differences at the same sampling points of the continuous neighboring symbols.

The comparison module 54 compares the sums of phase differences from the above 25 accumulators. The optimal sampling point is generated by an accumulator having the smallest phase difference in the accumulation module 53.

With reference to FIG. 2, every sampling point in a symbol is computed to get $$\left(\Delta\theta_n^2 - \frac{\pi}{4}\right)^2$$

by the phase difference generating circuit 51, and passes demultiplexer 52 to transfer the corresponding phase difference to the corresponding accumulator in the accumulation module 53 for accumulation (the first sampling point corresponds to the first accumulator 531, the second sampling point corresponds to the second accumulator 532, etc.). Therefore, when a sampling point is sampled, the corresponding accumulator accumulates phase differences $$\left(\Delta\theta_n^2 - \frac{\pi}{4}\right)^2$$

once. In the embodiment, the optimal sampling point is determined by accumulating phase differences at the same sampling points of 60 neighboring symbols; that means every accumulator of the accumulation module 53 accumulates phase differences $$\left(\Delta\theta_n^2 - \frac{\pi}{4}\right)^2$$

60 times totally. If we represent the process of accumulation in mathematical equation, then the first accumulator 531 is used to compute $$\sum_{n=25k} \left(\Delta\theta_n^2 - \frac{\pi}{4}\right)^2,$$

the second accumulator 532 is used to compute $$\sum_{n=25k+1} \left(\Delta\theta_n^2 - \frac{\pi}{4}\right)^2,$$

... and the 25$^{th}$ accumulator 533 is used to accumulate $$\sum_{n=25k+24} \left(\Delta\theta_n^2 - \frac{\pi}{4}\right)^2, \text{ wherein } k = 60.$$

Figure 3:
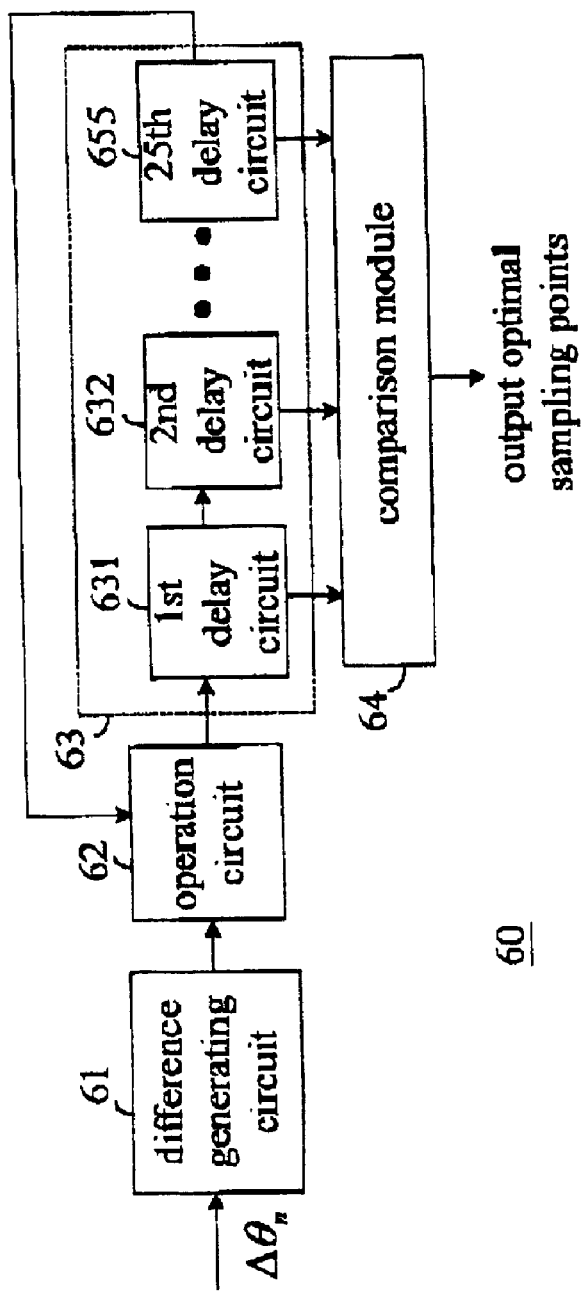
FIG. 3 is a block diagram of another embodiment of the symbol timing recovery circuit according to the present invention.

Please refer to FIG. 3, which shows another embodiment of the symbol timing recovery circuit 60 according to the present invention. The symbol timing recovery circuit 60 includes a phase difference generating circuit 61, an operation circuit (for example, an adder 62), a delay circuit module 63 and a comparison module 64. The phase difference generating circuit 61 and comparison module 64 in FIG. 3 are the same with those in FIG. 2. A first delay circuit 631 and second delay circuit 632 to 25$^{th}$ delay circuit 655 included in the delay circuit module 63 corresponds to the phase differences of 25 sampling points in a symbol. Therefore, when the phase difference of a sampling point passes 25 delay circuits (from the first delay to circuit 631, second delay circuit 632 and finally to the 25$^{th}$ delay circuit 655), a symbol time has been delayed. In other words, when the phase differences of the 25 sampling points pass a delay circuit simultaneously, the phase difference of the first sampling point outputted from the 25$^{th}$ delay circuit 655 will be added to the phase difference of the 26$^{th}$ sampling point by the adder 62. After passing a delay circuit, the phase difference of the second sampling point outputted from the 25$^{th}$ delay circuit 655 will be added to the phase difference of the 27$^{th}$ sampling point by the adder 62. After passing 25 delay circuits (i.e., a symbol time is passed), the phase difference of the 25$^{th}$ sampling point outputted by the 25$^{th}$ delay circuit 655 will be added to the phase difference of the 50$^{th}$ sampling point by the adder 62. In this embodiment, a delay of 60 symbol times is done. Meanwhile, every delay circuit accumulates the phase differences of every sampling point, and the comparison module 64 determines a delay circuit having the smallest phase difference in the delay circuit module 63. A sampling point corresponding to the delay circuit is the optimal sampling point. This structure has a longer computation time, but reduces the complexity of the circuit.

Figure 4:
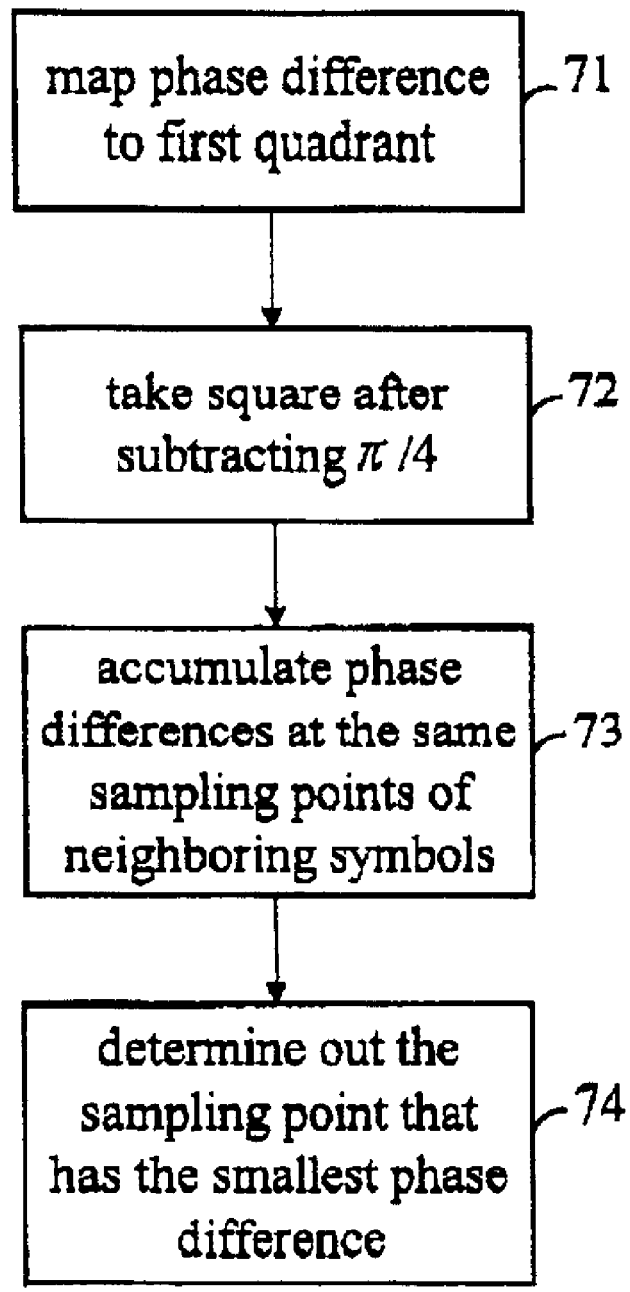
FIG. 4 is a flow chart of the symbol timing recovery method according to the present invention.

Please refer to FIG. 4, which is the flow chart of the symbol timing recovery method in phase modulation systems. The optimal sampling point in a symbol time is determined by computing the phase difference between the digital in-phase signal and quadrature signal at the same sampling points of neighboring symbols. In step 71, the phase difference at the same sampling points of neighboring symbol times is mapped to the first quadrant of the phase plane. In this embodiment, the most two significant bits of the first phase difference $$\Delta\theta_n^1$$

are discarded to map to the first quadrant of the phase plane. The result is called a second phase difference $$\Delta\theta_n^2.$$

In step 72, the phase difference mapped to the first quadrant (i.e., the second phase difference $\Delta\theta_n^2$)

is subtracted from a default phase value $\pi/4$, and the result is then taken square, represented as $$\left(\Delta\theta_n^2 - \frac{\pi}{4}\right)^2.$$

In step 73, the phase differences of the first to the 25$^{th}$ sampling points are computed, and the phase differences of the same sampling points of the continuous neighboring symbols are accumulated, represented as $$\sum_{n=25k+i-1} \left(\Delta\theta_n^2 - \frac{\pi}{4}\right)^2,$$

wherein $1 \leq i \leq 25$. It is the general equation for the computation of each accumulator, and i indicates the number of the accumulator. In this embodiment $1 \leq k \leq 60$ that means to perform accumulation at the same sampling points of 60 neighboring symbols. In step 74, a sampling point having the smallest phase difference is determined, and the sampling point is the optimal sampling point.

The above-described embodiments of the present invention are intended to be illustrated only. Numerous alternative embodiments may be devised by those skilled in the art without departing from the scope of the following claims.

What is claimed is:

1. A symbol timing recovery circuit, utilized in a phase demodulator, generating phase differences at the same sampling points of neighboring symbols to determine an optimal sampling point in a symbol period, comprising:

a phase difference generating circuit for first mapping the phase difference to a first quadrant of a phase plane, subtracting the mapped difference by a default phase value to obtain a result and taking a square of the result;

a selection circuit connected to the phase difference generating circuit for outputting the square of the result for every sampling point of a symbol to its corresponding output end;

an accumulation module including accumulators whose number is equal to the number of the sampling points in a symbol, said accumulators receiving the outputs of the selection circuit for accumulating the squared results of the same sampling points of continuous neighboring symbols; and a comparison module for comparing the sums of the squared results outputted from the accumulators; the optimal sampling point corresponding to an accumulator having the smallest sum of the squared results.

2. The symbol timing recovery circuit of claim 1, wherein the default phase value is $\pi/4$.

3. The symbol timing recovery circuit of claim 1, wherein said selection circuit is a demultiplexer.

4. The symbol timing recovery circuit of claim 1, wherein each of the symbols has 25 sampling points which means that a sampling rate is 25 times of a symbol rate.

5. A symbol timing recovery circuit, utilized in a phase demodulator to generate phase differences at the same sampling points of neighboring symbols to determine an optimal sampling point in a symbol period, comprising:

a phase difference generating circuit for mapping the phase difference to a first quadrant of a phase plane, subtracting the mapped difference by a default phase value to obtain a result and taking a square of the result;

an operation circuit for summing up the squared results of the same sampling points of neighboring symbols;

a delay circuit module including a plurality of delay circuits whose number is equal to the number of sampling points in a symbol; wherein the delay circuits are connected in series, and the output of the last delay circuit cooperates with the operation circuit to generate an input to a first delay circuit; and a comparison module for comparing the sums of the squared results outputted from the delay circuit module to determine an optimal sampling point corresponding to a delay circuit generating the smallest sum of the squared results.

6. The symbol timing recovery circuit of claim 5, wherein the fault phase value is $\pi/4$.

7. The symbol timing recovery circuit of claim 5, wherein said operation circuit is an adder.

8. The symbol timing recovery circuit of claim 5, wherein the symbol has 25 sampling points which means that a sampling rate is 25 times of a symbol rate.

9. A symbol timing recovery method, utilized in a phase demodulator to generate phase differences at the same sampling points of neighboring symbols to determine an optimal sampling point in a symbol period, comprising the following steps:

mapping a phase difference to a first quadrant of a phase plane;

subtracting the phase difference mapped to the first quadrant by a default phase value to obtain a result, and taking a square of the result;

computing the square of the result of every sampling point in a symbol, and accumulating the square of the results at the same sampling points of the continuous neighboring symbols; and determining a sampling point having the smallest sum of the squared results, thereby obtaining an optimal sampling point.

10. The symbol timing recovery method of claim 9, wherein the default phase value is $\pi/4$.

11. The symbol timing recovery method of claim 9, wherein the symbol has 25 sampling points, which means that a sampling rate is 25 times of a symbol rate.

* * * * *